Oct. 11, 1955 J. SUCHET ET AL 2,720,471
HIGH TEMPERATURE COEFFICIENT RESISTANCES COMPOSITIONS AND
RESISTANCE FORMED THEREFROM HAVING A SILICATE OR
BOROSILICATE COATING THEREON
Filed March 9, 1953
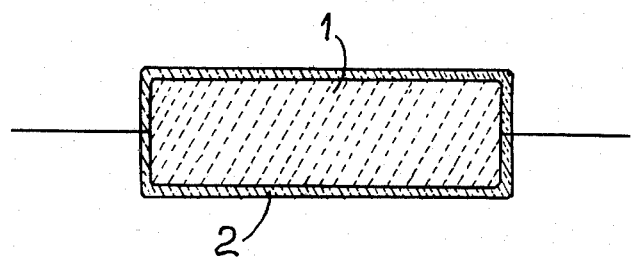
INVENTORS:
JACQUES SUCHET AND
N'GUYEN THIEN CHI
BY:

2,720,471

HIGH TEMPERATURE COEFFICIENT RESISTANCES, COMPOSITIONS AND RESISTANCE FORMED THEREFROM HAVING A SILICATE OR BOROSILICATE COATING THEREON

Jacques Suchet and N'Guyen Thien-Chi, Paris, France

Application March 9, 1953, Serial No. 341,304

Claims priority, application France March 12, 1952

3 Claims. (Cl. 117—229)

The present invention relates to negative temperature coefficient resistances and to coatings for the same, and more particularly to such resistances and coatings which are stable at high temperatures.

The use of resistances having a negative temperature coefficient is well known in the electronic field and these resistances are generally referred to by the terms "thermistances" and "thermistors." These elements have found important uses and are frequently utilized for thermometric and thermo-regulation devices.

These applications of thermistances often require that the elements have small dimensions, for example small rods of several cm. length and several mm. diameter. Under these conditions a resistance must be in the order of a thousand ohms at the mean temperature of utilization. The materials utilized must therefore have at this temperature a resistivity in the order of 100Ω/cm.

In our copending application Serial No. 339,406 filed February 27, 1953, for Negative Temperature Coefficient Resistances, we have disclosed thermistances made from the usual semi-conductive materials and being characterized by electrical stability as to time and the possibility of good reproducibility of the thermistances. The materials obtained have resistivities in the order of 50Ω to 100,000Ω/cm. at 25° C. and a temperature coefficient of −0.035 to −0.05Ω/Ω ° C., a resistivity in the order of 100Ω/cm. often being obtained with the materials utilized at temperatures from 0–300° C.

However, for many uses, it is desirable to have thermistances which have a resistivity in the order of 100Ω/cm. at temperatures above 300° C. and as high as 1000° C., these thermistances being designated according to the present invention, by the term "refractory thermistances." Until the present invention, it was impossible to obtain thermistances having such high resistivity at the high temperatures required and still being electrically stable as to time and being reproducible.

It is therefore an object of the present invention to provide thermistance compositions which have high resistivities, in the order of 100Ω/cm. at temperatures above 300° C.

It is another object of the present invention to provide thermistances having the required resistivity at high temperature and being nevertheless electrically stable as to time.

At temperatures of utilization above 300° C., refractory thermistances may have the oxygen content thereof modified because of the high temperature, such modification changing the properties of the thermistances.

It is therefore a further object of the present invention to provide coatings for refractory thermistances which prevent modification of the oxygen content of the thermistances of the present invention at the temperature of utilization thereof.

It is still a further object of the present invention to provide protective coatings for refractory thermistances which coatings have a fusion point above the maximum temperature of utilization of the thermistances.

Other objects and advantages of the present invention will become apparent from the further reading of the specification and of the appended claims.

The thermistances formed according to the present invention essentially consist of a fritted homogeneous mass of finely divided particles of metallic oxides adhering to each other, the metallic oxides consisting of oxides, preferably ternary oxides, of a plurality of the following metals: titanium, vanadium, chromium, manganese, iron, cobalt, nickel and copper, along with a refractory oxide such as alumina and/or silica in an amount not less than 10% by weight of the total composition. Preferably, the amount of alumina and/or silica is between 10–50% by weight of the total composition.

Throughout the present specification and claims the term "metallic oxides" is used to refer to the oxides of the metals from the group consisting of titanium, vanadium, chromium, manganese, iron, cobalt, nickel and copper. The term "refractory oxide" is used to refer to oxides such as alumina ($Al_2O_3$) and silica ($SiO_2$).

According to a preferred embodiment of the present invention the metallic oxides utilized in the composition consist at least partly of manganese oxide, preferably in the form of the sesquioxide, and at least one other oxide of a metal from the group of titanium, vanadium, chromium, iron, cobalt, nickel and copper. It is further preferred that in addition to manganese oxide, the metallic oxides include an oxide of at least one of the metals from the group of nickel, iron and cobalt. The mixture may contain in addition to the manganese all three of the metals, nickel, iron and cobalt, in the form of the oxides thereof; and in such case it may also be desirable to add copper to the mixture, also in the form of the oxide thereof.

Utilizing in addition to the manganese oxide, an oxide of at least one of the metals Ni, Fe, Co and Cu, it is preferred that the ratio by weight of the amount of manganese ion in the composition to the total amount of the other metallic ions in the composition (Mn/x, wherein x represents the total amount of other ions from among the group Ni, Fe, Co and Cu) in the form of the oxides thereof, should preferably be between 1 and 4.

Compositions containing mixtures of metallic oxides within the following limits given in the percentage of the amount of the particular metallic ion to the total amount by weight of metallic ions in the composition, the metals being in the form of the oxides, have given excellent results with reference to the objects of the present invention.

| | Per cent |
|---|---|
| Mn | 40–80 |
| Ni | 3–14 |
| Co | 17–10 |
| Fe | 1–10 |

If the composition also contains copper oxides, the amount of copper ion with reference to the total amount of Mn, Ni, Co and Fe ions should be between 8–30%.

Whatever the composition of metallic oxides, within the limits given above for the present invention, the amount of refractory oxides, preferably alumina, is between 10–50% by weight of the total composition.

It is known that the resistivity of semi-conductor materials obtained by compression and burning at high temperatures of mixtures of powdered metallic oxides, is given by the equation:

$$\rho_T = \rho_\infty e^{\frac{B}{T}}$$

wherein $\rho_T$ is the resistivity at the absolute temperature T. $\rho_\infty$ is a constant representing the resistivity at very high temperatures and B is a constant characteristic of the material utilized.

If it is desired that the resistivity for different materials still be 100Ω/cm. at different temperatures T of utilization, it is necessary that the above equation have the same value, and since the term $\rho_\infty$ varies very little for materials of analogous composition, that the constant B be proportional to the mean temperature of utilization T.

It has been found according to the present invention that mixtures of alumina with the metallic oxides mixtures of the present invention, i. e. oxides of manganese and nickel, in which the concentration of alumina is greater than 10%, satisfies the condition of chemical stability which is indispensable for the utilization of the composition at high temperatures and which further permits the realization of compositions which are stable at temperatures even greater than 1000° C., the concentration of alumina being a maximum of 50% by weight of the total composition. The value of the constant B can be greater than 12,000 with compositions of the present invention, although a value for the constant B of only up to 3000, is sufficient with reference to the main objects of the present invention.

Although the scope of the present invention is not meant to be limited to any theory as to why or how the compositions of the present invention attain the desired characteristics, an explanation may be found in the fact that the compositions of the present invention are formed partly of metallic oxides which can acquire the characteristics of semi-conductors, the resistivity of which has a negative temperature coefficient by reason of the modified content of oxygen after burning; and on the other hand the oxides have a good chemical stability and a sufficiently high resistivity under usual conditions so as to be classifiable in the category of insulators.

It may be seen therefore that at ordinary temperatures the materials obtained have a relatively high resistivity which resistivity by reason of the temperature coefficient attains the desired value at a sufficiently high temperature.

The properties of semi-conductor bodies are a function of the oxygen contained therein. These properties control the negative temperature coefficient of the resistivity of the thermistance. At high temperatures, the oxygen may be liberated or oxygen may be absorbed, which as a consequence injures the stability of the electrical characteristics of the thermistance.

It is therefore necessary to protect the thermistances of the present invention from any change in oxygen content at the high temperatures of utilization of the thermistances. According to the present invention the thermistances are protected from any change in oxygen content during use at high temperatures by providing the same with a coating. Such coating in order to be suitable must have a number of characteristics: first the coating must have a fusion point which is higher than the temperature of utilization of the thermistance; the coating must be gas-tight at the temperature of utilization; moreover the composition of the coating must match the underlying composition of the thermistance to the extent that the coating composition be chemically inert with respect to the composition of the thermistance and also to the industrial gas currents such as oxygen, ammonia, hydrogen, carbon dioxide, chlorine, etc., in order to protect the thermistance if the same is maintained in an atmosphere of one of these gases.

With the necessity in view that the coating have the above designated characteristics, the coatings according to the present invention which may be utilized with the thermistance compositions of the present invention, namely the compositions of metallic oxides above designated and between 10–50% by weight of alumina, are compositions of zinc and/or lead silicates and/or borosilicates.

It is possible to use as the coating, lead silicate, zinc silicate, lead borosilicate, zinc borosilicate, or mixtures thereof. Preferably the coating composition is formed by heating a mixture of lead oxide, zinc oxide, silica and boric anhydride so as to form a mixture of lead and zinc silicates and borosilicates. It is further preferable that the mixture contain alumina in addition to the lead oxide, zinc oxide, silica and boric anhydride, the entire mixture being heated to form a mixture of different compounds.

The following examples are given as illustrative of the formation of preferred thermistances and coatings therefor according to the present invention, the scope of said invention not however being limited to the examples given.

Example 1

Pure manganese oxide and nickel oxide are mixed with pure alumina in a jar of a non-oxidizable alloy having a great hardness, in the following proportions by weight:

| | Per cent |
|---|---|
| $Mn_2O_3$ | 67 |
| NiO | 16 |
| $Al_2O_3$ | 18 |

Balls of tungsten carbide are put into the mixture and the jar is partially filled with liquid. After tightly closing the jar, it is rotated for about 400 hours. The jar is then opened and the contents thereof dried in an oven, then sifted and stocked.

The powder is then molded under very high pressure into the form of small rods and then cooked in a special furnace.

Connections are then fixed to the small rods and the same are submitted to a stabilization treatment.

The material thus obtained has the following characteristics:

Constant B, about 7,000.
Resistivity of 100Ω=cm. at a temperature of 430° C.
Temperature coefficient at 430° C., 0.014Ω/Ω ° C.

These thermistances according to the present invention can be utilized with continuous current for applications in thermometry and thermoregulation without any appreciable polarization phenomena being caused, that is to say that no electromotive force is built up.

However, such thermistance can only be easily used at high temperatures if the same is protected by means of a protective coating according to the present invention.

Example 2

Pure oxides of lead and zinc are mixed with alumina, silica and boric anhydride in the following proportions by weight:

| | Per cent |
|---|---|
| PbO | 55 |
| ZnO | 20 |
| $Al_2O_3$ | 10 |
| $SiO_2$ | 5 |
| $B_2O_3$ | 10 |

The mixture is placed in a porcelain jar. Balls of porcelain are put into the mixture and the jar is closed and rotated for a period of about 50 hours. The jar is then opened and its contents finely sifted and stocked.

A paste is formed with a little of this powder mixed with a little water and the same is applied by means of a brush in two layers on the refractory thermistance formed according to Example 1.

The thus coated thermistance is heated to a temperature of 650° C., which is slightly greater than the softening temperature of the coating.

The thus formed element is then submitted to a stabilization treatment for the material of the semi-conductor, which stabilization treatment must be at a temperature below the softening temperature of the coating.

The above coating composition may therefore be conveniently used for a thermistance having an approximate maximum utilization temperature of 500° C., that is to say a material such as formed in Example 1.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure illustrates a thermistance and coating in accordance with the present invention.

Referring now more particularly to the drawing, the small rod 1 consists of a composition such as described in Example 1 which has a high negative temperature coefficient at elevated temperatures, i. e., even above 400° C. The rod 1 is completely covered by a coating 2 which may consist of the composition described in Example 2 and which is chemically inert at the high temperature of utilization to both the composition of the rod 1 and to the outside atmosphere. The coating 2 prevents degagement of oxygen from the composition of the rod 1 during use.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fritted homogeneous composition particularly suitable for high temperature stable negative temperature coefficient resistances, consisting essentially of manganese oxide and nickel oxide; and between 10–50% by weight of the weight of the total composition of at least one substance selected from the group consisting of alumina and silica, the ratio by weight of the amount of manganese ion to the amount of nickel ion in said composition being between 1 and 4.

2. A fritted homogeneous composition particularly suitable for high temperature stable negative temperature coefficient resistances, consisting essentially of manganese sesquioxide, nickel oxide and at least one substance selected from the group consisting of alumina and silica in an amount of 10–50% by weight of the total composition, the ratio by weight of the amount of manganese ion to the amount of nickel ion in said composition being between 1 and 4.

3. A high temperature stable negative temperature coefficient resistance, comprising a fritted homogeneous body consisting essentially of manganese sesquioxide and nickel oxide, the ratio by weight of the amount of manganese ion to the amount of nickel ion in said composition being between 1 and 4; between 10–50% by weight of the weight of the total composition of at least one substance selected from the group consisting of alumina and silica; and a coating completely covering said fritted homogeneous body, said coating consisting essentially of at least one substance selected from the group consisting of lead and zinc silicates and borosilicates.

References Cited in the file of this patent

UNITED STATES PATENTS

| | | |
|---|---|---|
| 2,154,387 | Sleeman | Apr. 11, 1939 |
| 2,590,893 | Sanborn | Apr. 1, 1952 |
| 2,590,894 | Sanborn | Apr. 1, 1952 |